Sept. 3, 1940.   G. W. EMRICK   2,213,579
VARIABLE MULTIPLE HEAD
Filed Dec. 16, 1938   2 Sheets-Sheet 1
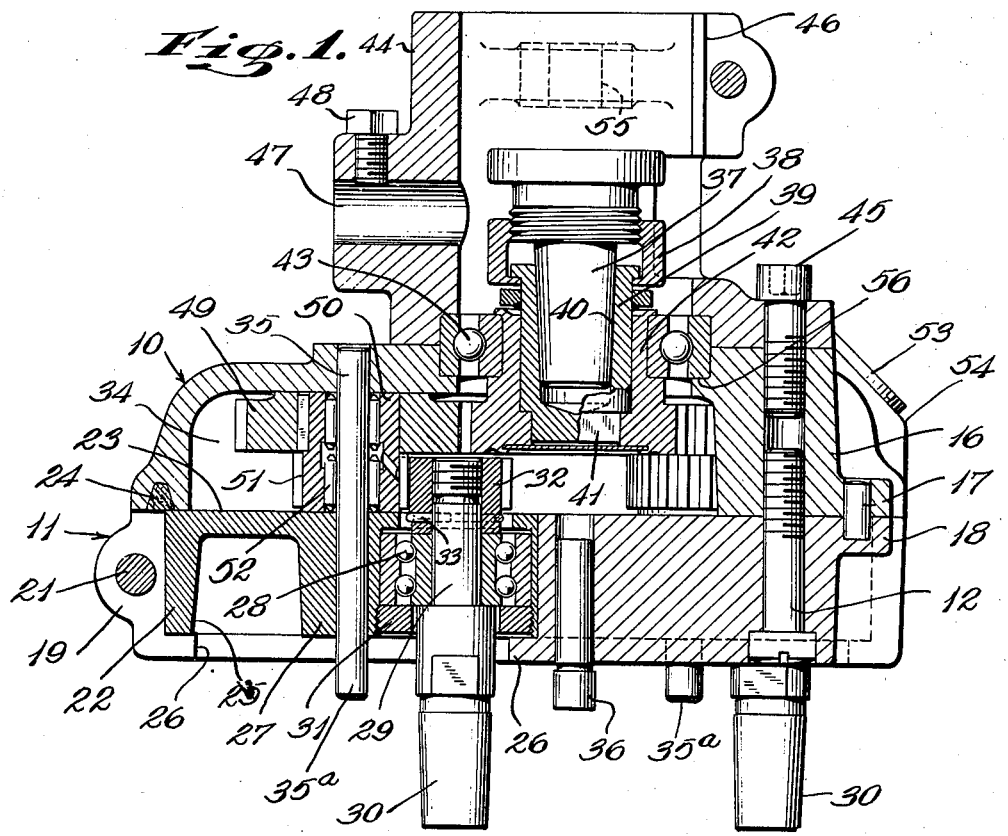
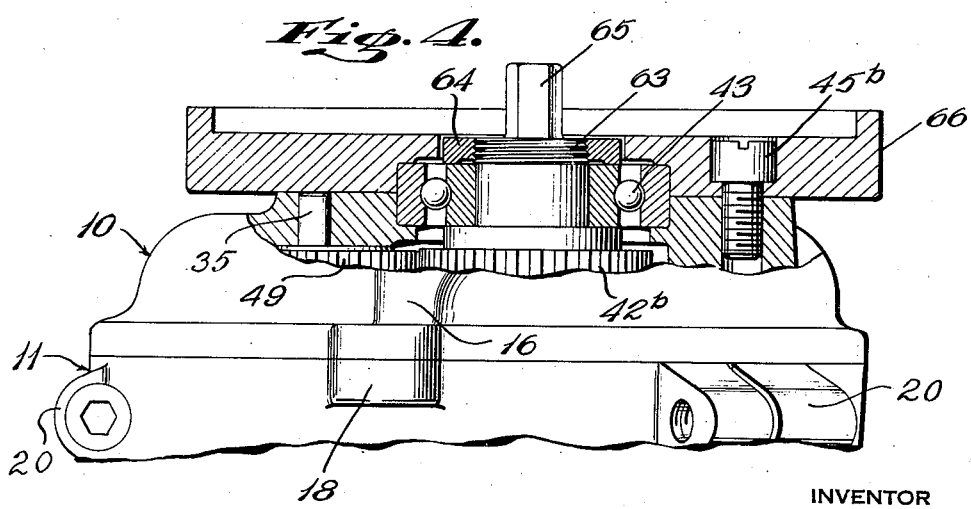
INVENTOR
GEORGE W. EMRICK
BY
ATTORNEY Patented Sept. 3, 1940

2,213,579

UNITED STATES PATENT OFFICE 2,213,579

VARIABLE MULTIPLE HEAD

George W. Emrick, Brooklyn, N. Y.

Application December 16, 1938, Serial No. 246,132

15 Claims. (Cl. 10—130)

This invention relates to what are commonly termed multiple heads; that is to say, attachment to drill presses and like machines for supporting and operating a plurality of tool supporting chucks whereby a plurality of drills or taps supported in said chucks may be actuated simultaneously in performing a plurality of drilling or tapping operations in a workpiece; and the object of the present invention is to provide a multiple head of the character described employing a plurality of chuck supporting discs rotatable about independent axes, wherein said independent axes are spaced circumferentially with respect to a central driving axis, whereby substantially unlimited relative spacing of the tool supporting chucks one with respect to another within a given area, defined only by the relative ratio of rotary adjustable movement of the chucks collectively, is possible, and restricted solely by the closeness of adjustment of the chucks one with respect to the other and an intermediate or driving axis; a further object being to provide a multiple head attachment of the character described employing a central drive spindle and two or more rotatably adjustable discs, the axes of said discs being spaced circumferentially with respect to said drive spindle, the chuck spindles being freely rotatable in each disc and bodily movable with the discs, gears arranged on said chuck spindles meshing with gears revolving on the axes of said discs and having other gears keyed thereto meshing with a gear driven by said drive spindle; a still further object being to provide protruding members on the lower exposed surface of the head definitely locating the axis of each adjustable disc and of said drive spindle so as to simplify the setting of the several chuck spindles one with respect to the other to register with proper spaced points on a predetermined workpiece; a further object being to provide means for loosening the mounting of each adjustable disc in the head and for firmly securing the disc in adjustable position so as to maintain the respective chucks in fixed relationship to each other and to the axis of the drive spindle; a still further object being to provide a casing structure which will be universally adaptable to different types of mountings in connection with various types and kinds of machines thereby producing a multiple head which will be suitable for the different uses without changing or modifying the structure of the multiple head; a still further object being to provide means for forming a seal around each of the adjustable discs to retain lubrication within the gear case of the multiple head; and with these and other objects in view, the invention consists in a device of the class and for the purpose specified which is simple in construction, efficient in use, and which is constructed as hereinafter described and claimed.

The invention is fully disclosed in the following specification, of which the accompanying drawings form a part, in which the several parts of my invention are designated by suitable reference characters in each of the views, and in which:

Fig. 1 is a sectional view through a multiple head made according to my invention showing one method of mounting the same, the section being substantially on the line 1—1 of Fig. 2.

Fig. 4 is a view similar to Fig. 3 showing a further form of mounting.

The device forming the subject matter of this application constitutes an improvement on that disclosed in my prior Patent No. 1,998,275 issued April 16, 1935. While for purposes of illustration I have shown in the accompanying drawings an arrangement of three rotatable chuck supporting discs, the heads may be constructed of two, three or four rotatable disc units in the relatively small or medium sized heads such as disclosed, whereas in larger heads, any desired multiple may be provided. In the different instances or arrangements, it is preferred that the several gears will be standardized so that replacements may be readily made and further so that the gears and other parts of one type and kind of head structure, within one general unit size, will be the same and interchangeable thereby simplifying the cost of production of the head.

Figure 2:
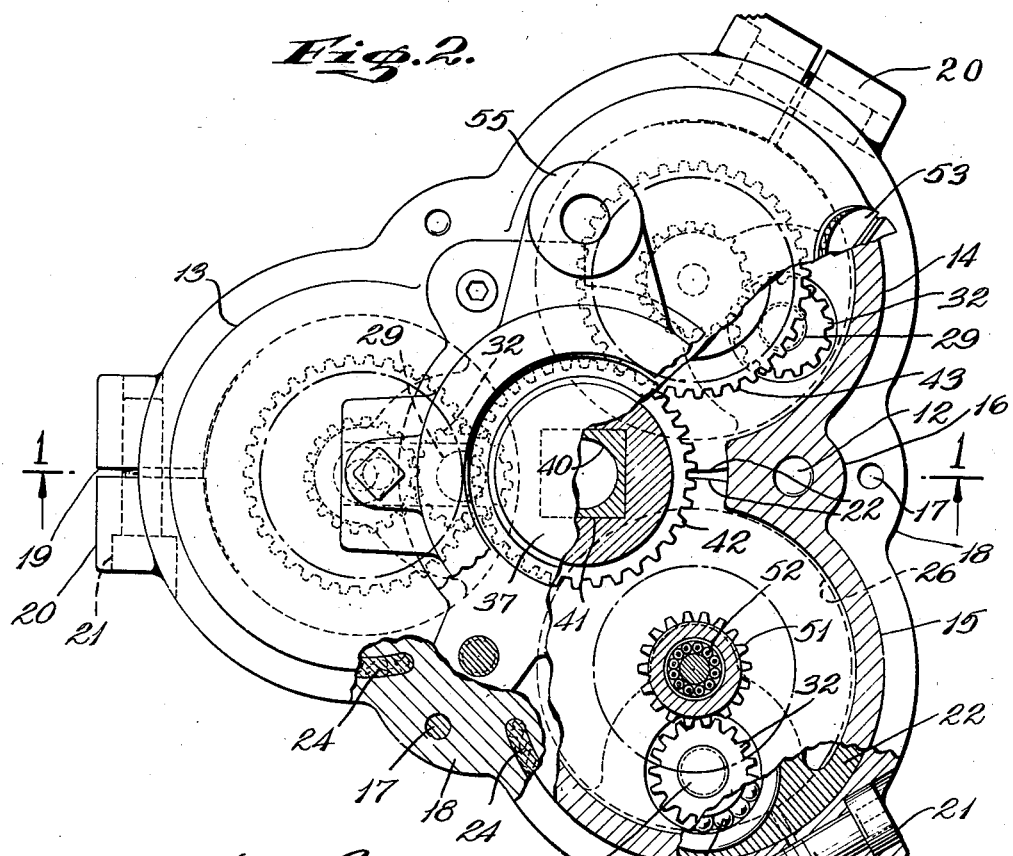
Fig. 2 is a plan view of the structure shown in Fig. 1 with parts of the construction broken away and in section.

In the several figures, the head comprises a top casing part 10 and a lower part 11, both parts in the arrangement shown being what might be termed clover-leaf design as is indicated in Fig. 2 of the drawings. The parts are screwed together by three screws 12 arranged intermediate each of the cylindrical and intersecting casing portions 13, 14 and 15, or in webs 16 joining said portions. Alinement pins 17 are also employed between projecting ears 18 on the casing parts, one of which is shown in Fig. 1 of the drawings. The pins 17 serve to accurately aline the casing parts one upon the other. The casing part 11 or each cylindrical portion thereof is split at the point furthest remote from the center of the casing as seen at 19. At each side of the split are enlarged bosses 20 in which are disposed clamp screws 21 so as to firmly clamp the cylindrical portions of the casing part 11 upon rotatably adjustable chuck supporting discs 22, one of which is shown in section in Fig. 1 of the drawings.

In that each disc is of the same general construction, the brief description of one will apply to all. Each disc comprises a substantially inverted dish-shaped body, the upper surface 23 of which is flat and seats upon the lower surface of the casing part 10. Suitable horseshoe-shaped packings 24 are disposed between adjacent surfaces of the cylindrical portions 13, 14 and 15, the rings extending from the intersecting ends of said cylinders throughout the remainder of the cylinders and crossing the splits as at 19. The purpose of this construction is to form an oil seal between the cylinder portions of the respective casing parts 10 and 11.

The downwardly directed peripheral flanges 25 of the discs 22 seat upon inturned flanges 26 at the lower surface of the casing part 11 as clearly seen at the left of Fig. 1. The flanges 26 are circumferentially continuous except for the splits 19. Each disc is provided with an enlarged body portion 27 which extends from the peripheral flange 25 inwardly to include the hub portion of the disc. Arranged in this enlarged body is a double ball bearing 28 in which is supported a spindle 29 with which the usual or any desired form of tool supporting chuck may be coupled on the lower tapered end 30 thereof, the chuck being omitted in that it forms no direct part of the present invention. The bearing 28 is held in position by a ring type nut 31, whereas the spindle 29 is secured against displacement in the bearing by a pinion 32 in threaded engagement with the spindle and keyed thereto by a spring ring key pin 33, the latter extending into the spindle as will be apparent. The pinion 32 is disposed upon the upper surface of the disc 22 and is arranged in the chamber 34 in the lower surface of the casing part 10.

Each disc 22 is rotatable around a short shaft or pin 35 having a drive fit in the casing part 10 or otherwise secured therein. The lower end 35a of this pin protrudes through the bottom of the enlarged portion 27 of the disc to form a centering device to aid in calculating the adjustment of the several spindles 29 one with respect to the other. In this connection a centering pin 36 is also secured in the central portion of the casing part 11 as seen in Fig. 1. The pin 36 is in accurate alinement with the spindle 37 of a drill press or tapping machine, only part of which is shown in the present illustration merely to illustrate its attachment with a spindle coupling sleeve 38 freely rotatable around a coupling plug 39. The latter has a tapered bore 40 for receiving the spindle 37 and a squared or other angular end 41 for keying the plug and in turn the spindle 37 to a drive gear 42 having a ball bearing mounting as at 43 in the upper end of the casing part 10.

In the construction shown in Figs. 1 and 2, I have also shown a mounting bracket 44, the base of which is secured to the casing part 10 by screws 45 arranged in alinement with the screws 12. The upper end portion of the bracket is split as seen at 46 to be clamped around a quill or other support for supporting the head. This provides one form of mounting, other forms of mounting being later described. The bracket 44 includes a radially extending socket 47 for the usual check rod, not shown, which is secured in position by a set screw 48, this rod being conventionally used to retain the head against rotation in the machine.

The gear 42 has its gear portion disposed in the chamber 34 and meshes with three similar gears 49 encircling the shafts 35 and keyed to upwardly directed sleeve portions 50 on three pinions 51, the latter having roller or other bearings 52 upon the shafts 35, as clearly seen at the left of Fig. 1 of the drawings. The pinions 51 mesh with the pinions 32. It will thus be seen that in the rotation of the discs 22, to adjust the position of the spindles 29 one with respect to the other, the pinions 32 will travel around the pinions 51 while constantly maintaining mesh therewith. After a desired adjustment has been attained, the screws 21 will be tightened to securely retain the discs 22 against rotary movement, and in the operation of the multiple head, all of the spindles 29 will be simultaneously driven at the same speed from the gear 42 through the gears 49, pinions 51 and 32, as will be apparent. By reason of the ball and roller bearing mountings of the several rotary parts, it will be understood that the spindles 29 may be rotated at high speeds. It will also appear that relatively long bearings are provided for the spindles 29 as well as duplex gears 49, and pinions 51.

At 53 in Fig. 1 of the drawings is shown a screw cap controlling a lubrication admission aperture in one enlarged side 54 of the casing part 10 so that grease or other lubricants may be introduced into the chamber 34 to lubricate the gears as well as the several bearings, and as previously stated, this lubrication is sealed by the packings 24 employed. A part of the cap 53 is also indicated in Fig. 2 of the drawings.

In Fig. 2 of the drawings, the bracket 44 is also shown as provided with an offset apertured lug 55 which is also indicated in dotted lines in Fig. 1 of the drawings. The lug is employed to receive the usual vertical guide rod to maintain alinement of the head in the vertical movement thereof toward and from a workpiece, also to key the head to maintain proper alinement with respect to workpiece supporting fixtures and the like in order to maintain accurate engagement of the tools with the workpiece as will be apparent.

Figure 3:
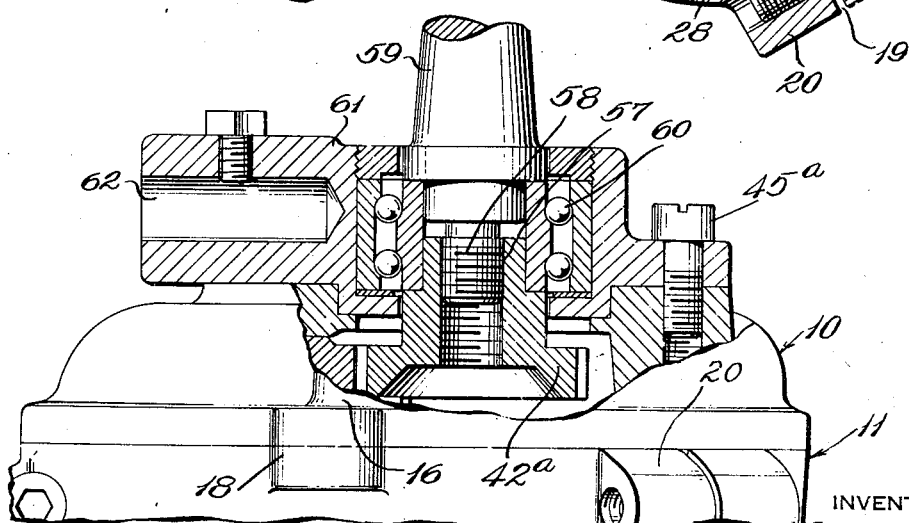
Fig. 3 is a side and sectional view of the upper portion of the multiple head shown in Figs. 1 and 2 but illustrating a modified form of mounting.

It will appear that in Figs. 3 and 4 of the drawings, the casing part 10 is standardized to adapt the same to different types of fittings for attachment to different machines. That is to say, the bearing 43 seats in a socket 56 centrally of the upper portion of the casing part 10, and this socket is common in all figures. The aperture formed in the socket portion is sufficiently large to provide for the insertion of the gear 42 or a similar gear 42a as shown in Fig. 3. The gear 42a differs in construction by the provision of a threaded bore 57 for receiving the threaded end 58 of a tapered spindle 59. The latter, as well as the upper end of the gear 42, seats in a double ball bearing 60 arranged in a bracket portion 61 which is secured in position by screws 45a similar to the screws 45. The bracket 61 has a socket 62 for the check rod retaining the head against rotation. Aside from the mounting described, the structure in Fig. 3 is the same as that shown in Figs. 1 and 2.

In Fig. 4 of the drawings a gear 42b is employed and seats in a bearing 43 identical to the bearing shown in Fig. 1. The gear 42b, however, is threaded at its upper end as seen at 63 to receive a ring type nut 64 for securing the gear against displacement from the bearing 43, and the upper end of the gear 42b is provided with a protruding angular shank 65.

Secured upon the upper face of the casing 10 is an adapter disc 66 held in position by screws 45b similar to the screws 45 and fitting in the same threaded apertures of the casing part 10. This adapter plate is standardized to fit the coupling of a tapping attachment such as disclosed in the prior patent hereinbefore mentioned, suitable bolts being provided to couple the plate with the standardized coupling of the tapping attachment. It will be noted on a consideration of Fig. 1 of the patent referred to, that the cover 36 is substantially equivalent to the disc 66 in the present application so as to fit the coupling plate 26, and the angular shank 65 is equivalent to the angular shank or spindle 33 of the patent. The head shown in Fig. 4 is otherwise the same structure as that shown in Figs. 1 and 2 of the drawings.

It will be apparent that any other type and kind of mounting may be provided to suit the head to machines of various kinds and classes, but in all instances it will be desirable except on very special cases, to maintain the standardized construction of the head so as to economize on the cost of production thereof. In employing other multiples in the chuck spindles of a multiple head, it will be apparent that different forms of casings 10 and 11 will be employed, but wherever possible, the discs 22 as well as the gears 49 and pinions 51 and 32 will be maintained standard. However, in some instances, the size of the gear 42 may be enlarged or decreased in size, and as above stated, this will be maintained except in special cases where other arrangements will be desirable and wherein the several parts may be modified as to respective or comparative sizes.

By providing the protruding ends 35a on the shafts 35 and the center pins 36, it will appear that the setting of the several spindles one with respect to the other may be more readily calculated, and this is especially true when the center pin 36 is centralized upon a given workpiece. It will be understood that the closest arrangement of the spindles 29 with respect to each other would be when disposed nearest to the center pin 36, whereas the farther spacing would be when the spindles are disposed at the greatest distance from the center pin 36, or in other words, when adjacent and in alinement with the splits 19 in the casing 11. However, any irregular adjustment of the spindles may be provided so that substantially any location of these three spindles may be provided within a diameter fixed by the outermost adjustment of the spindles with respect to the axis 36, and the closest spacing governed by the adjustment of said spindles nearest to the axis 36. In the illustration in Fig. 2 of the drawings, one of the spindles, that disposed in the cylinder 13, is arranged in its closest adjustment with respect to the axis 36, whereas the spindle in the cylinder 14 is shown on substantially a half-way adjustment at the side of the cylinder nearest the cylinder 15, whereas in the cylinder 15, the spindle is shown nearer the limit of its outward adjustment. In connection with the foregoing, it will of course be apparent that the spindles may be relatively adjustable one with respect to the other apart from any particular fixed center of the workpiece. This is especially true in drilling and tapping workpieces of irregular or unbalanced contour.

It will appear from a consideration of the present disclosure that each of the spindles are driven at the same speed. It will be understood, however, that in some instances, gearing may be employed which will operate the spindles at different speeds particularly when different taps are arranged in a single multiple head and simultaneously operated or in operating with different drills or reamers.

Having fully described my invention, what I claim as new and desire to secure by Letters Patent, is:

1. A multiple head of the class described comprising a casing, a plurality of members independently and rotatably adjusted about fixed axes in said casing, a spindle freely rotatable in each member and movable into different positions around the axis of the member in which the spindle is supported in the adjustment of said member, a driving gear supported in the casing, means for placing said gear in operative engagement with a driving means, and means including gears meshing with the driving gear for placing the rotatable spindle of each member in operative engagement with said driving gear whereby all of the spindles will be simultaneously rotated in the operation of said driving gear.

2. A multiple head of the class described comprising a casing, a plurality of members rotatably adjusted about fixed axes in said casing, a spindle freely rotatable in each member and movable into different positions around the axis of the member in which the spindle is supported in the adjustment of said member, a driving gear supported in the casing, means for placing said gear in operative engagement with a driving means, means comprising gears meshing with the driving gear for placing the rotatable spindle of each member in operative engagement with said driving gear whereby all of the spindles will be simultaneously rotated in the operation of said driving gear, said gears consisting of a combination large and small gear unit freely rotatable upon each axis of said members, and a pinion keyed to each spindle with one gear of each unit meshing with the driving gear and the other gear of each unit meshing with the pinion on the associated spindle.

3. A multiple head of the class described comprising a casing, a plurality of members rotatably adjusted about fixed axes in said casing, a spindle freely rotatable in each member and movable into different positions around the axis of the member in which the spindle is supported in the adjustment of said member, a driving gear supported in the casing, means for placing said gear in operative engagement with a driving means, means comprising gears meshing with the driving gear for placing the rotatable spindle of each member in operative engagement with said driving gear whereby all of the spindles will be simultaneously rotated in the operation of said driving gear, said gears consisting of a combination large and small gear unit freely rotatable upon each axis of said members, a pinion keyed to each spindle with one gear of each unit meshing with the driving gear and the other gear of each unit meshing with the pinion on the associated spindle, said casing being composed of a gear housing part and a part supporting said members, means for coupling and keying said parts, and means retaining each member in the second named casing part against movement in different positions of adjustment thereof.

4. A multiple head of the class described comprising a casing, a plurality of members rotatably adjusted about fixed axes in said casing, a spindle freely rotatable in each member and movable into different positions around the axis of the member in which the spindle is supported in the adjustment of said member, a driving gear supported in the casing, means for placing said gear in operative engagement with a driving means, means comprising gears meshing with the driving gear for placing the rotatable spindle of each member in operative engagement with said driving gear whereby all of the spindles will be simultaneously rotated in the operation of said driving gear, said gears consisting of a combination large and small gear unit freely rotatable upon each axis of said members, a pinion keyed to each spindle with one gear of each unit meshing with the driving gear and the other gear of each unit meshing with the pinion on the associated spindle, said casing being composed of a gear housing part and a part supporting said members, means for coupling and keying said parts, means retaining each member in the second named casing part against movement in different positions of adjustment thereof, and means forming a seal between adjacent casing parts, whereby the first casing part may be packed with a lubricant.

5. A multiple head of the class described comprising a casing, a plurality of members independently and rotatably adjusted about fixed axes in said casing, a spindle freely rotatable in each member and movable into different positions around the axis of the member in which the spindle is supported in the adjustment of said member, a driving gear supported in the casing, means for placing said gear in operative engagement with a driving means, means including gears meshing with the driving gear for placing the rotatable spindle of each member in operative engagement with said driving gear whereby all of the spindles will be simultaneously rotated in the operation of said driving gear, and the casing structure being standardized to adapt the same for attachment to various supporting and mounting devices used in coupling the head with a suitable machine.

6. A multiple head of the class described comprising a casing, a plurality of discs rotatably adjustable in the casing around fixed shafts, said discs having surfaces exposed through one end of the casing, a tool supporting spindle freely rotatable in each disc and protruding through said open end of the casing, a pinion fixed to each spindle within said casing, a double gear unit freely rotatable upon each of said shafts, one of the gears of each unit meshing with the pinion on the spindle adjacent said unit, a drive gear centrally of the casing and opening through the other end thereof for attachment to a drive shaft, and said last named gear meshing with the other gear of all of said units, whereby all of said spindles are simultaneously rotated in the rotation of said drive gear.

7. A multiple head of the class described comprising a casing, a plurality of discs rotatably adjustable in the casing around fixed shafts, said discs having surfaces exposed through one end of the casing, a tool supporting spindle freely rotatable in each disc and protruding through open end of the casing, a pinion fixed to each spindle within said casing, a double gear unit freely rotatable upon each of said shafts, one of the gears of each unit meshing with the pinion on the spindle adjacent said unit, a drive gear centrally of the casing and opening through the other end thereof for attachment to a drive shaft, said last named gear meshing with the other gear of all of said units, whereby all of said spindles are simultaneously rotated in the rotation of said drive gear, said shafts projecting through the open end of the casing, and a center pin arranged in alinement with the axis of the drive gear and protruding through the open end of the casing to provide in conjunction with said protruding shaft ends and the protruding spindles, means for gaging the setting of said spindles one with respect to the other.

8. A multiple head of the class described comprising a casing, a plurality of discs rotatably adjustable in the casing around fixed shafts, said discs having surfaces exposed through one end of the casing, a tool supporting spindle freely rotatable in each disc and protruding through said open end of the casing, a pinion fixed to each spindle within said casing, a double gear unit freely rotatable upon each of said shafts, one of the gears of each unit meshing with the pinion on the spindle adjacent said unit, a drive gear centrally of the casing and opening through the other end thereof for attachment to a drive shaft, said last named gear meshing with the other gear of all of said units, whereby all of said spindles are simultaneously rotated in the rotation of said drive gear, the portions of the casing in which each of said discs are mounted being substantially cylindrical in form, and means coupling the split ends of each cylindrical portion of the casing for securely clamping each disc against movement in different positions of adjustment thereof.

9. A multiple head of the class described comprising an upper inverted cup-shaped casing having a plurality of outer semi-cylindrical portions converging into a central bearing portion, another casing part secured and keyed to the lower surface of the first named part and comprising a plurality of cylinder portions registering with the cylindrical portions of the first named casing part, a rotatably adjustable member fitting snugly in each cylindrical portion of the second named casing part and forming, in conjunction with said part, a substantially closed wall to the open bottom of the first named casing part, each cylindrical portion of the second named casing part being split, means clamping the split portions together in retaining the adjustable members in different positions of adjustment, tool supporting spindles movable with and freely rotatable in each of said members and projecting through the lower end of the second named casing part, and means comprising a driving gear for simultaneously rotating all of said spindles in the different positions of adjustment thereof.

10. A multiple head comprising a casing having a central drive member, a plurality of shafts spaced circumferentially around said drive member, discs rotatably adjustable around said shafts and exposed through one end of the casing, means on each disc and movable therewith in the adjustment thereof for supporting tools, means for placing the last named means of each disc in operative engagement with the driving member, whereby all of said means are simultaneously rotated in the operation of said member, and means on the casing retaining each disc in the different positions of adjustment thereof.

11. A multiple head of the class described comprising a casing, a plurality of independent tool spindle supports in said casing, each support having a fixed axis, each spindle support being capable of complete rotary adjustment about its fixed axis, the spindle in said support being offset with respect to said axis, driving means in said casing, and means placing each spindle in operative engagement with the driving means in the different positions of adjustment of each spindle, whereby all spindles will be simultaneously rotated in the operation of said driving means.

12. A multiple head of the class described comprising a casing, a plurality of independent tool spindle supports in said casing, each support having a fixed axis, each spindle support being capable of complete rotary adjustment about its fixed axis, the spindle in said support being offset with respect to said axis, driving means in said casing, means placing each spindle in operative engagement with the driving means in the different positions of adjustment of each spindle, whereby all spindles will be simultaneously rotated in the operation of said driving means, and means retaining each of said supports in different positions of adjustment.

13. In a multiple head of the class described employing a driver, a plurality of members, each member being rotatable about a fixed axis, and a tool supporting spindle rotatable in and movable with each of said members, center locating means at the underside of said head, said means comprising a pin in axial alinement with said driver, the extended axis of said members, and the axis of said spindles, whereby the setting of all of the spindles one with respect to the other and to the axis of said driver may be conveniently and accurately calculated in the proper setting of the tool supporting spindles of said head.

14. A multiple head comprising a casing, a driver in said casing, a plurality of spindle supports arranged in said casing circumferentially of said driver, each support having a fixed axis, each of said supports being capable of complete rotary adjustment about its axis, the spindle in each support being offset with respect to its axis, means placing the driver in operative engagement with each spindle with different positions of adjustment of said supports, said casing having a socket portion for the reception of said driver, the casing around said socket having threaded apertures at predetermined spaced intervals, and said socket and apertures being standardized with various supporting brackets in coupling and adapting the head to different types of machines.

15. In a multiple head of the class described employing a driver arranged centrally thereof, a plurality of discs rotatably supported in said head, said discs being spaced from each other to provide independent and non-confliction rotary adjustment thereof in said head, a tool spindle supported adjacent the periphery of each disc whereby in the rotation of said discs the positions of the spindles will be adjusted in said head, and means placing the driver in operative engagement with all of said spindles to simultaneously operate the same in all positions of rotary adjustment of said discs.

GEORGE W. EMRICK.